US012085399B2

(12) United States Patent
Suplin et al.

(10) Patent No.: US 12,085,399 B2
(45) Date of Patent: Sep. 10, 2024

(54) MODULAR MACHINE-LEARNING BASED SYSTEM FOR PREDICTING VEHICLE ENERGY CONSUMPTION DURING A TRIP

(71) Applicant: GM GLOBAL TECHNOLOGY OPERATIONS LLC, Detroit, MI (US)

(72) Inventors: Vladimir Suplin, Modiin (IL); Klaus Trangbaek, Ein Vered (IL); Daniel Urieli, Herzliya (IL)

(73) Assignee: GM Global Technology Operations LLC, Detroit, MI (US)

( * ) Notice: Subject to any disclaimer, the term of this patent is extended or adjusted under 35 U.S.C. 154(b) by 104 days.

(21) Appl. No.: 17/590,019

(22) Filed: Feb. 1, 2022

(65) Prior Publication Data
US 2023/0243662 A1 Aug. 3, 2023

(51) Int. Cl.
*G01C 21/34* (2006.01)
*G01C 21/36* (2006.01)

(52) U.S. Cl.
CPC ..... *G01C 21/3469* (2013.01); *G01C 21/3484* (2013.01); *G01C 21/3691* (2013.01)

(58) Field of Classification Search
CPC ............ G01C 21/3469; G01C 21/3484; G01C 21/3691
See application file for complete search history.

(56) References Cited

U.S. PATENT DOCUMENTS

| | | | | |
|---|---|---|---|---|
| 11,602,999 | B1 * | 3/2023 | Flatland | G05D 1/0217 |
| 2002/0152040 | A1 * | 10/2002 | Majoe | G01B 11/16 |
| | | | | 702/150 |
| 2011/0238457 | A1 * | 9/2011 | Mason | G06Q 10/063112 |
| | | | | 705/7.14 |
| 2014/0088799 | A1 * | 3/2014 | Tino | G05D 1/0005 |
| | | | | 703/2 |
| 2018/0172462 | A1 * | 6/2018 | De Nunzio | G01C 21/343 |

(Continued)

OTHER PUBLICATIONS

Fuel Consumption Sensitivity of Conventional and Hybrid Electric Light-Duty Gasoline Vehicles to Driving Style, SAE International, John Thomas, published Aug. 11, 2017 (hereafter Thomas) (Year: 2017).*

(Continued)

*Primary Examiner* — Anne Marie Antonucci
*Assistant Examiner* — Patrick M Brady
(74) *Attorney, Agent, or Firm* — Quinn IP Law

(57) ABSTRACT

A system for predicting energy consumption by a vehicle during a trip has a controller adapted to receive a route plan for the trip. The controller has a processor and tangible, non-transitory memory on which instructions are recorded. The system has a plurality of machine learning modules, including a behavior predictor, a driving consumption predictor and an auxiliary consumption predictor. The controller is adapted to predict a total energy consumed by the vehicle during the trip by executing the plurality of machine learning modules. The driving consumption predictor is adapted to predict a primary energy consumed for propelling the vehicle based in part on the route plan. The auxiliary consumption predictor is adapted to predict a secondary energy consumed by the vehicle for non-propulsion purposes. The behavior predictor is adapted to predict an average vehicle speed based at least partially on traffic conditions.

16 Claims, 4 Drawing Sheets

(56) References Cited

U.S. PATENT DOCUMENTS

2020/0070679 A1\* 3/2020 Wang ................ B60L 58/21
2020/0376927 A1\* 12/2020 Rajaie ............... B60H 1/00764
2022/0118823 A1\* 4/2022 Seyedsalehi ......... B60H 1/0073

OTHER PUBLICATIONS

A Stochastic Range Estimation Algorithm for Electric Vehicles Using Traffic Phase Classification, Stafan Scheubner, IEEE Transactions on Vehicular Technology, vol. 68, No. 7, Jul. 2019 (hereafter Scheubner). (Year: 2019).\*

\* cited by examiner

MODULAR MACHINE-LEARNING BASED SYSTEM FOR PREDICTING VEHICLE ENERGY CONSUMPTION DURING A TRIP

INTRODUCTION

The present disclosure relates generally to an energy consumption prediction system for a vehicle. More specifically, the disclosure relates to a modular machine-learning based system for predicting (prior to a trip) the amount of energy consumed by a vehicle during the trip. The prediction of energy consumption along a route is useful for trip planning for electric vehicles. Some energy consumption predictors use physics-based models. However, physics-based predictors require intensive modeling efforts, along with elaborate development and tuning processes. This makes them hard to transfer to new vehicle models. Additionally, certain types of discrepancies in the actual drive versus the planned route (e.g., speed) may not be considered in such modelling approaches.

SUMMARY

Disclosed herein is a system for predicting energy consumption by a vehicle during a trip. The system has a controller with a processor and tangible, non-transitory memory on which instructions are recorded. The controller is adapted to receive a route plan for the trip. The system has a plurality of machine learning modules, including a behavior predictor, a driving consumption predictor and an auxiliary consumption predictor. The driving consumption predictor is adapted to predict a primary energy consumed for propelling the vehicle based in part on the route plan. The auxiliary consumption predictor is adapted to predict a secondary energy consumed by the vehicle for non-propulsion purposes. The controller is adapted to predict (prior to the trip) a total energy consumed by the vehicle during the trip by executing the plurality of machine learning modules.

The machine learning modules may include at least two different types of machine learning models. In some embodiments, the auxiliary consumption predictor includes an HVAC sub-module adapted to predict the secondary energy consumed by the vehicle for heating, cooling and ventilation purposes. The auxiliary consumption predictor may include a battery thermal conditioning sub-module adapted to predict the secondary energy consumed by the vehicle for thermal conditioning. The total energy consumed by the vehicle during the trip is obtained by adding the primary energy and the secondary energy. The system may include a communications interface adapted to receive the route plan, including a starting point, a destination and a selected route for the trip.

The system may include a feature extractor adapted to extract a first set of features. The trip has a number of trip segments such that the first set of features includes an average traffic speed of each of the trip segments in the trip. The behavior predictor is adapted to receive the average traffic speed. The first set of features may include traffic data, time data and weather data, with the traffic data including live speed, speed limits and historical speed, the time data including a time of day and a day of week, and the weather data including ambient temperature, wind speed and wind direction. The feature extractor may be adapted to extract weather data, including ambient temperature. In some embodiments, the feature extractor may calculate a first temperature deviation of the ambient temperature above a predefined neutral temperature and a second temperature deviation of the ambient temperature below the predefined neutral temperature.

The behavior predictor may be adapted to generate a predicted average vehicle speed for each of the trip segments, the predicted average vehicle speed being based in part on the average traffic speed, a squared value of the average traffic speed and a set of learned coefficients. The predicted average vehicle speed (AVS) may be obtained as: [AVS=a+b*ATS+c*ATS$^2$], where the average traffic speed is ATS, the squared value of the average traffic speed is ATS$^2$ and the set of learned coefficients is (a, b, c). The predicted average vehicle speed (AVS) may be used to calculate at least two hinge functions, including MAX (0, AVS) and MAX (0, AVS−v1), where v1 is a predetermined speed.

The feature extractor may be adapted to extract a second set of features. The driving consumption predictor may be adapted to receive the second set of features and the predicted average vehicle speed generated by the behavior predictor. The auxiliary consumption predictor may be adapted to receive the second set of features. The second set of features may include route data and weather data. The route data may include respective values of latitude, longitude, elevation, length and road quality of the trip segments. The weather data may include ambient temperature, wind speed and wind direction.

Disclosed herein is a method of operating a system for predicting energy consumption by a vehicle during a trip, the vehicle having a controller with a processor and tangible, non-transitory memory. The method includes receiving a route plan for the trip, via the controller, the controller having access to a plurality of machine learning modules, including a behavior predictor, a driving consumption predictor and an auxiliary consumption predictor. The method includes predicting a primary energy consumed for propelling the vehicle based in part on the route plan, via the driving consumption predictor; and predicting a secondary energy consumed for non-propulsion purposes in the vehicle, via the auxiliary consumption predictor. A total energy consumed by the vehicle during the trip is predicted by executing the plurality of machine learning modules, via the controller.

The above features and advantages and other features and advantages of the present disclosure are readily apparent from the following detailed description of the best modes for carrying out the disclosure when taken in connection with the accompanying drawings.

Figure 1:
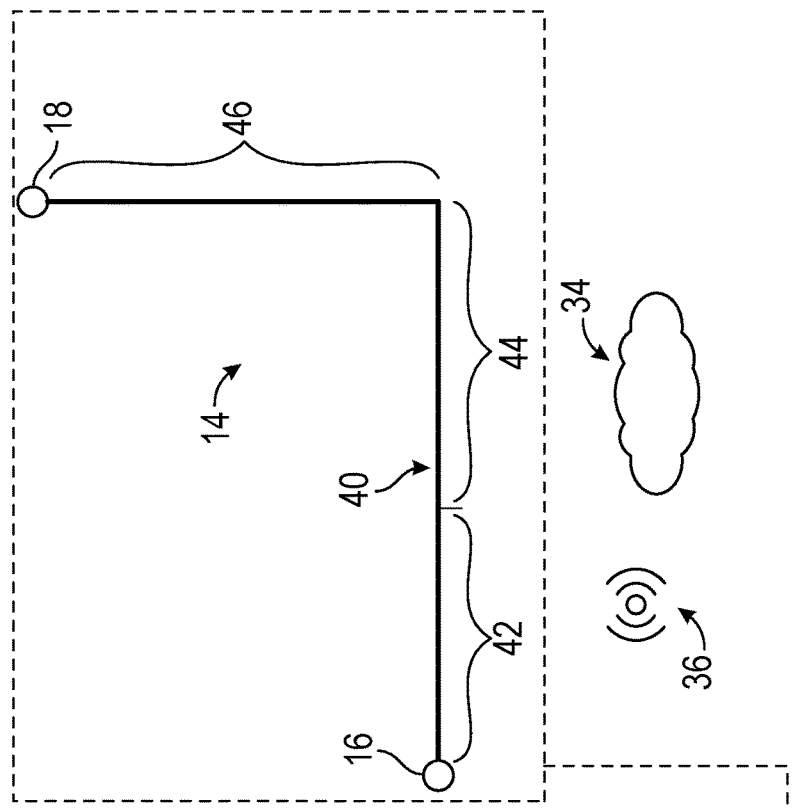
FIG. 1 is a schematic fragmentary diagram of a system with a plurality of machine learning modules for predicting energy consumption in a vehicle.
Figure 1:
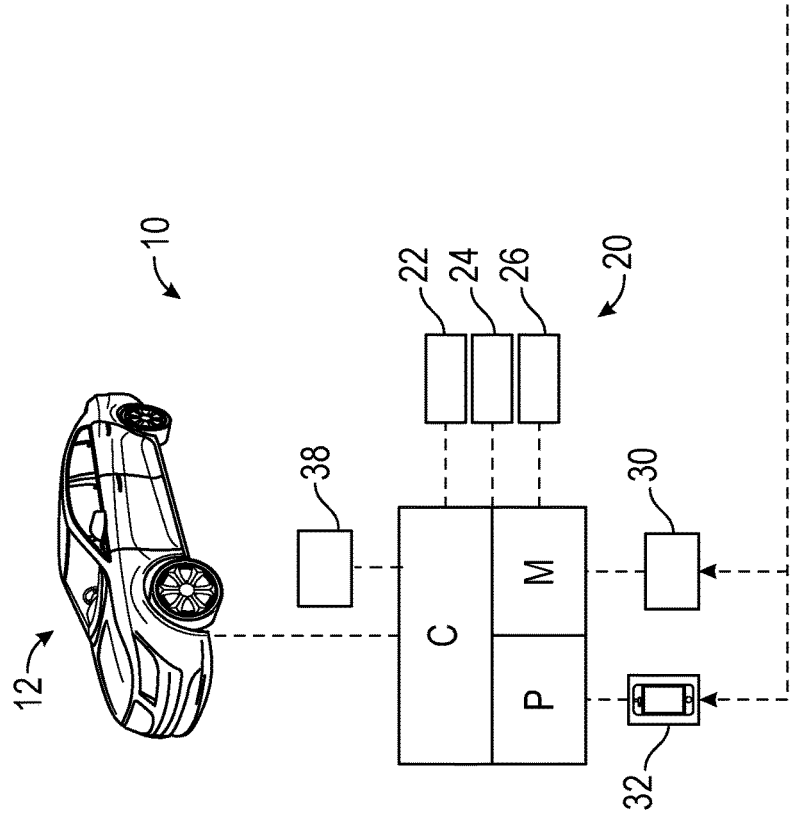

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers refer to like components, FIG. 1 schematically illustrates a system 10 for a vehicle 12. The vehicle 12 may include, but is not limited to, a passenger vehicle, sport utility vehicle, light truck, heavy duty vehicle, minivan, bus, transit vehicle, bicycle, moving robot, farm implement (e.g., tractor), sports-related equipment (e.g., golf cart), boat, airplane and train. The vehicle 12 may be an electric vehicle, which may be purely electric or hybrid/partially electric. It is to be understood that the vehicle 12 may take many different forms and have additional components.

Referring to FIG. 1, the system 10 is a modular machine-learning based system for predicting energy consumption during a route or trip of the vehicle 12, the prediction being made prior to the trip. Referring to FIG. 1, an example trip 14 is shown, beginning at starting point 16 and ending at destination 18. The system 10 includes a plurality of machine learning modules 20 ("plurality of" omitted henceforth) each receiving a respective input and producing a respective output. The machine learning modules each include a nonlinear mapping. These mappings can be neural networks or some combination of nonlinear functions (hinge/polynomial/saturations) and linear gains or one of many different other ways to build such a map. The gains and parameters may be learned by a data-driven approach. The machine learning modules 20 include a behavior predictor 22, driving consumption predictor 24, and an auxiliary consumption predictor 26. The driving consumption predictor 24 models vehicle dynamics and components related to instant energy consumption for propelling the vehicle 12. Stated differently, the driving consumption predictor 24 is adapted to predict a driving energy or primary energy consumed for purposes of moving the vehicle 12 (e.g., consumed by hybrid engine).

The behavior predictor 22 models driving style to predict the speed of the vehicle 12 based in part on traffic conditions which may include, for example, live traffic data, peak hours, holidays, downstream traffic congestion level, road type, weather conditions and other factors. In some embodiments, the behavior predictor 22 may be personalized for each driver. The auxiliary consumption predictor 26 models energy consumption by the vehicle 12 for non-propulsion or auxiliary purposes, as will be described below.

Figure 2:
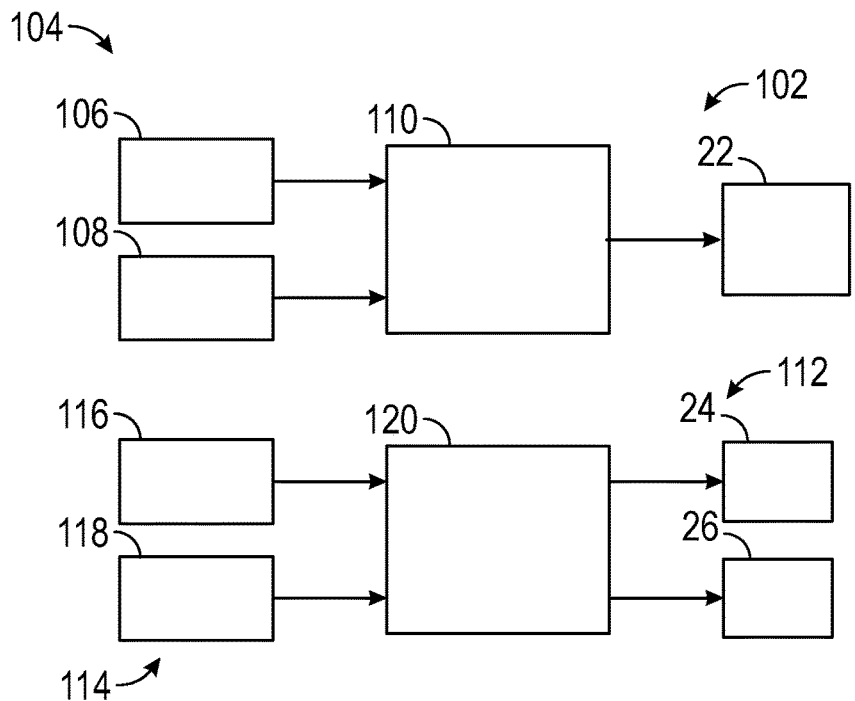
FIG. 2 is a schematic fragmentary diagram illustrating example training sequences for the machine learning modules of FIG. 1.
Figure 3:
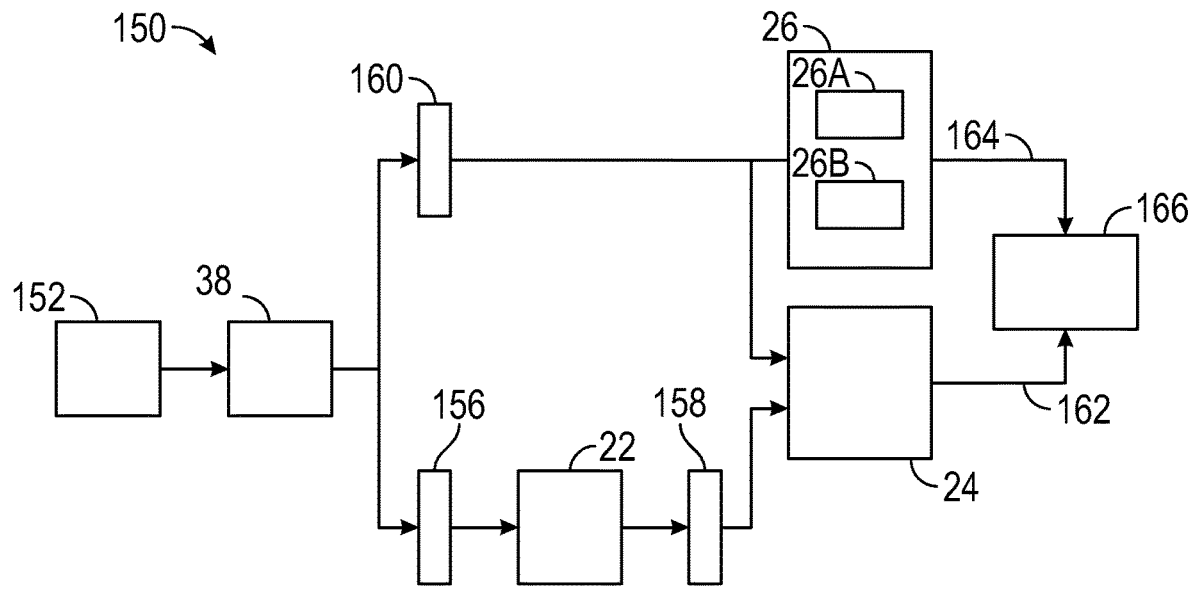
FIG. 3 is a schematic fragmentary diagram illustrating an example deployment phase for the machine learning modules of FIG. 1.

FIG. 2 is a schematic diagram of an example first training sequence 102 and an example second training sequence 112 for the machine learning modules 20. FIG. 3 shows an example deployment phase 150 for the machine learning modules 20. Because of its modular structure, the system 10 has the ability to retrain one of the machine learning modules 20 while leaving the other machine learning modules 20 fixed. This reduces the burden for retraining when applying the system 10 to a modified vehicle model, a new vehicle model, a different driver or other context.

The system 10 is characterized by a modular architecture that allows for mixing of prediction models of different types for different modules. As will be described below, each of the machine learning modules 20 may incorporate a different or the same type of machine learning algorithm, e.g., a neural network, a simple linear regression model and other types of machine learning models available to those skilled in the art.

Referring to FIG. 1, the vehicle 12 includes a controller C having at least one processor P and at least one memory M (or non-transitory, tangible computer readable storage medium) on which instructions are recorded for executing a method 200 (described below with respect to FIG. 4) for predicting energy consumption in the vehicle 12 during the trip 14. Block 202 of method 200 describes predictor training, while block 204 through to block 214 describe predictor operation. The controller C has access to and selectively executes the machine learning modules 20. The controller C of FIG. 1 may be an integral portion of, or a separate module operatively connected to, other controllers of the vehicle 12. For example, the controller C may be an electronic control unit (ECU) of the vehicle 12. The memory M can store controller-executable instruction sets, and the processor P can execute the controller-executable instruction sets stored in the memory M.

Referring to FIG. 1, the route plan may be entered through a communications interface 30 that is accessible to a user or operator of the vehicle 12. The communications interface 30 may include a touchscreen or other IO device and may be integrated in the infotainment unit of the vehicle 12. In some embodiments, the route plan may be entered through a mobile application 32 that is in communication with the controller C. For example, the mobile application 32 may be physically connected (e.g., wired) to the controller C as part of the vehicle infotainment unit. The mobile application 32 may be embedded in a smart phone belonging to a user of the vehicle 12 and plugged or otherwise linked to the vehicle 12. The circuitry and components of a mobile application 32 ("apps") available to those skilled in the art may be employed. The communications interface 30 may also be employed for vehicle-to-vehicle (V2V) communication and/or a vehicle-to-everything (V2X) communication.

The machine learning modules 20 may be stored in the vehicle 12. In some embodiments, the machine learning modules 20 may be stored in a remotely located or "off-board" cloud computing service, referred to herein as cloud unit 34, that interfaces with the controller C. The cloud unit 34 may include one or more servers hosted on the Internet to store, manage, and process data, maintained by an organization, such as for example, a research institute or a company. The machine learning modules 20 may be updateable via remote updates.

Referring to FIG. 1, the controller C may be configured to communicate with the cloud unit 34 via a wireless network 36. The wireless network 36 of FIG. 1 may be a short-range network or a long-range network. The wireless network 36 may be a communication BUS, which may be in the form of a serial Controller Area Network (CAN-BUS). The wireless network 36 may incorporate a Bluetooth™ connection, a Wireless Local Area Network (LAN) which links multiple devices using a wireless distribution method, a Wireless Metropolitan Area Network (MAN) which connects several wireless LANs or a Wireless Wide Area Network (WAN). Other types of connections may be employed.

Referring to FIG. 1, the system 10 includes a feature extractor 38 in communication with the controller C. The feature extractor 38 is adapted to extract various features (for example, through computer programming that converts available information into a specific format) from the route plan, in-vehicle and external sensors, the cloud unit 34 and other sources.

Figure 4:
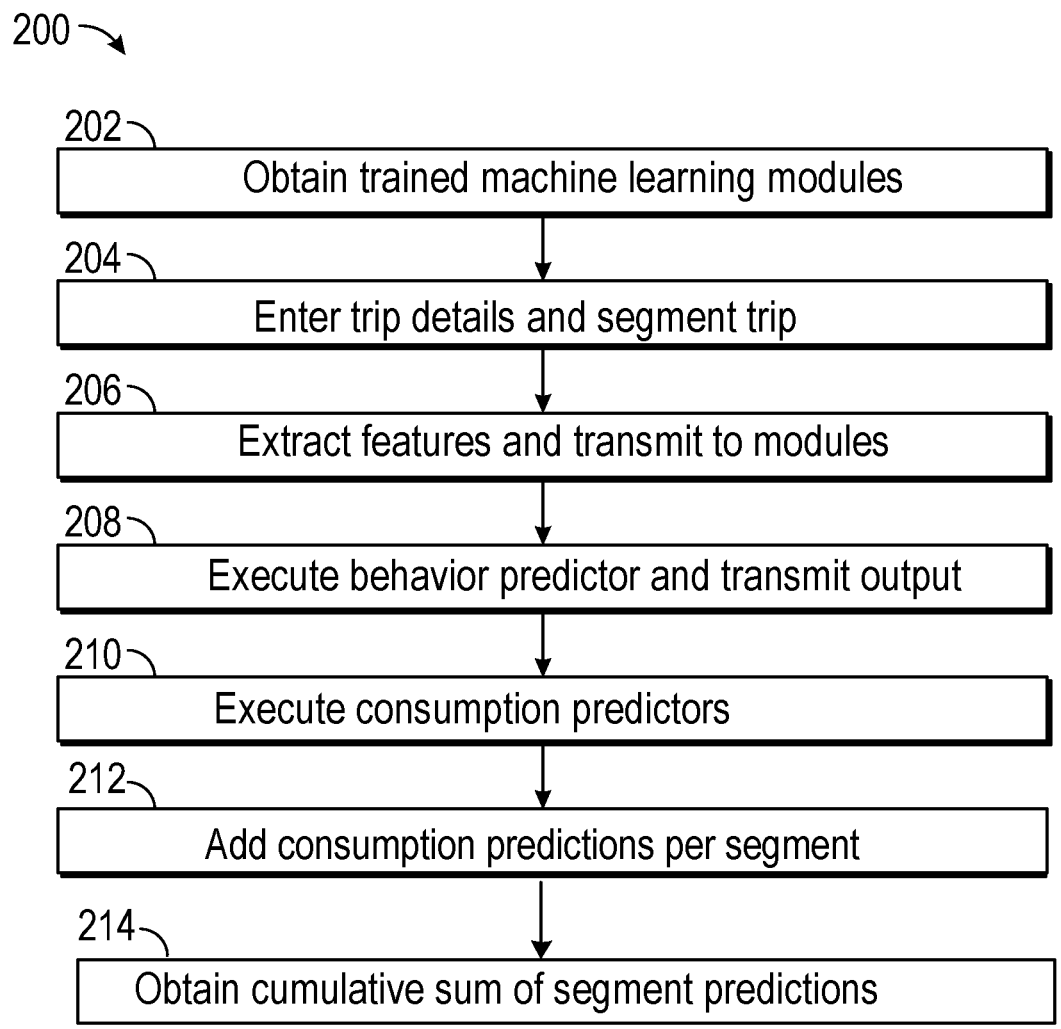
FIG. 4 is a flowchart of an example method for predicting energy consumption in a vehicle.

Referring now to FIG. 4, an example flowchart of the method 200 is shown. Method 200 may be embodied as computer-readable code or instructions stored on and partially executable by the controller C of FIG. 1. Method 200 need not be applied in the specific order recited herein and may be dynamically executed. Furthermore, it is to be understood that some steps may be eliminated. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Per block 202 of FIG. 4, the method 200 includes training the machine learning modules 20. FIG. 2 is a schematic diagram of an example first training sequence 102 and an example second training sequence 112 for the machine learning modules 20. If the driver follows a plan, there will be matched data. If the driver does not drive according to a plan or does not have a plan, there will be recorded data but no plan data. Referring to FIG. 2, the first training sequence 102 uses matched data 104, such as route plan data 106 matched with its corresponding actual recorded drive data 108. The route plan data 106 may include route information (e.g., which road or highway is being taken, the latitude, longitude, elevation and length of each of the trip segments, the road classification or quality), traffic data (e.g., live speed, speed limits, historical speed), time data (e.g., time of day, day of the week) and weather information (e.g., temperature, wind speed, wind direction and UV index). The actual recorded drive data 108 also includes route information such as latitude, longitude, elevation, length of trip segments, actual speeds, time data, weather information, however, these originate from different sources. For example, while the latitude, longitude and altitude in the route plan data 106 may be sourced from a map, their recorded counterparts in the actual recorded drive data 108 may be sourced from a GPS unit. The matched data 104 is fed into a machine learning predictor training unit 110 to train the behavior predictor 22.

Referring to FIG. 2, the second training sequence 112 uses recorded data 114, such as actual trip data 116 and actual energy consumption 118. The recorded data 114 is fed into a machine learning predictor training unit 120 for training the driving consumption predictor 24 and the auxiliary consumption predictor 26. The technical advantage of the system 10 is that, unlike monolithic-style architectures that require training datasets that cover entire working conditions, incomplete or unmatched datasets (e.g., recorded data 114) may be utilized.

Advancing to block 204 of FIG. 4, the controller C is programmed to obtain the details of the trip 14. For example, the user may enter a route plan 152 (see FIG. 3) via the communications interface 30 or mobile application 32 of FIG. 1. For example, a route planner may generate candidate routes and send them to the predictor to get their predicted consumption, which helps in selecting an energy efficient route. In some embodiments, block 204 includes dividing the trip 14 into multiple trip segments 40. Referring to FIG. 1, the trip 14 may be divided into many different segments, referred to herein as trip segments 40 (e.g., first segment 42, second segment 44 and third segment 46). In one embodiment, the trip segments 40 are about 4 kilometers each. Each individual trip segment 40 may be made up of multiple smaller segments or sub-segments in the collecting and processing phase.

Proceeding to block 206 of FIG. 4, the method 200 includes extracting and transmitting a plurality of features, for example, via the feature extractor 38 shown in FIG. 1. Referring to FIG. 3, a route plan 152 is inputted into the feature extractor 38, which extracts a first set of features 156 and a second set of features 160. The route plan 152 may include, but is not limited to, the starting point 16, the destination 18, the selected route and time of day that the trip 14 is planned for. The first set of features 156 may include traffic data (e.g., live speed, speed limits, and historical speed of each of the trip segments 40), time data (e.g., length of each of the trip segments 40, time of day, day of the week) and weather information (e.g., temperature, wind speed, wind direction and UV index). Referring to FIG. 3, the first set of features 156 are inputted into the behavior predictor 22.

Referring to FIG. 3, the second set of features 160 are inputted into the driving consumption predictor 24 and the auxiliary consumption predictor 26. The second set of features 160 may include route information (e.g., latitude and longitude of each of the trip segments 40, elevation, length of each of the trip segments 40, the road classification or quality) and weather information (e.g., temperature, wind speed, wind direction and UV index).

The controller C and/or feature extractor 38 may be adapted to calculate a first temperature deviation of the ambient temperature above a predefined neutral temperature (if positive; otherwise set to 0). The feature extractor 38 may be adapted to calculate a second temperature deviation of the ambient temperature below the predefined neutral temperature if positive; otherwise set to 0). For example, if the predefined neutral temperature was selected to be 18 degrees Celsius and the ambient temperature was 25 degrees Celsius, the first and second temperature deviations would be 7 and 0 degrees Celsius, respectively. If the predefined neutral temperature was 18 degrees Celsius and the ambient temperature was −2 degrees Celsius, the first and second temperature deviations would be 0 and 20 degrees Celsius, respectively. The first and second temperature deviations may be employed as inputs to the auxiliary consumption predictor 26.

Advancing to block 208 of FIG. 4, the controller C is programmed to execute the behavior predictor 22. The behavior predictor 22 receives as input the first set of features 156 (see FIG. 3) as input, including an average traffic speed per segment. The output 158 (see FIG. 3) of the behavior predictor 22 is the predicted average vehicle speed (AVS) per segment, which is transferred into the driving consumption predictor 24. The predicted average vehicle speed (AVS) may be determined based in part on the average traffic speed (ATS), a squared value of the average traffic speed ($ATS^2$) and a set of coefficients (a, b, c) as follows: $[AVS=a+b*ATS+c*ATS^2]$. The parameters a, b, and c are learned from the training process described above.

Proceeding to block 210 of FIG. 4, the controller C is programmed to execute the driving consumption predictor 24. In the embodiment shown in FIG. 3, the driving consumption predictor 24 has two inputs: the output 158 of the behavior predictor 22 and the second set of features obtained by the feature extractor 38. The output of the driving consumption predictor 24 is the predicted driving energy (energy to propel the vehicle 12) consumed for each trip segment 40. The predicted driving energy consumed is obtained as a linear combination of the multiple inputs, whose coefficients are learned from the vehicle consumption data.

The driving consumption predictor 24 may calculate multiple hinge functions based on the predicted average vehicle speed (AVS). By way of example, the hinge functions may be: MAX (0, AVS), MAX (0, AVS−90), MAX (0, AVS−105) and MAX (0, AVS−115), where the predicted average vehicle speed is in kilometers per hour. For example, if the predicted average vehicle speed is 95 kilometers per hour, the four hinge functions would have the values {95, 5, 0, 0}. If the predicted average vehicle speed is 60 kilometers per hour, the four hinge functions would have the values {60, 0, 0, 0}. The hinge functions may be employed to select an appropriate aerodynamic mathematical model for the driving consumption predictor 24. For example, the surface friction and/or wind resistance encountered by a vehicle 12 changes with its speed and affect the driving energy consumed.

Continuing with block 210 of FIG. 4, the controller C is programmed to execute the auxiliary consumption predictor 26. Referring to FIG. 3, the auxiliary consumption predictor 26 may include one or more sub-modules, e.g., an HVAC (heating, ventilation and air-conditioning) sub-module 26A adapted to predict the secondary energy consumed by an HVAC unit of the vehicle 12 with the aid of various coefficients learned from past HVAC data. In another example, the auxiliary consumption predictor 26 may include a battery thermal conditioning sub-module 26B adapted to predict the secondary energy consumed for thermal conditioning a vehicle battery.

Proceeding to block 212 of FIG. 4, the method 200 includes predicting a total energy consumed by the vehicle 12 per segment during the trip 14 by summing up the drive and auxiliary consumption predictions per segment. Referring to FIG. 3, the respective outputs 162, 164 of the driving consumption predictor 24 and the auxiliary consumption predictor 26 are summed or added together in the total consumption predictor 166 to generate the total energy consumption per segment for the vehicle 12 for the route plan 152. This allows a user of the vehicle 12 to better anticipate range or fuel concerns pertaining to the trip 14, as well as compare energy consumption for different route plans 152. The modular architecture allows using predictor components as a part of a consumption monitoring system to detect anomalies within the vehicle 12. In other words, the predicted total energy consumption may be used for performance monitoring of the vehicle 12. Advancing to block 214 of FIG. 4, the method 200 includes obtaining a cumulative sum of each of the segment predictions. Block 214 may include interpolating the predictions in each waypoint (or sub-segment) between the beginning and end of a full segment ("super segment").

Figure 5:
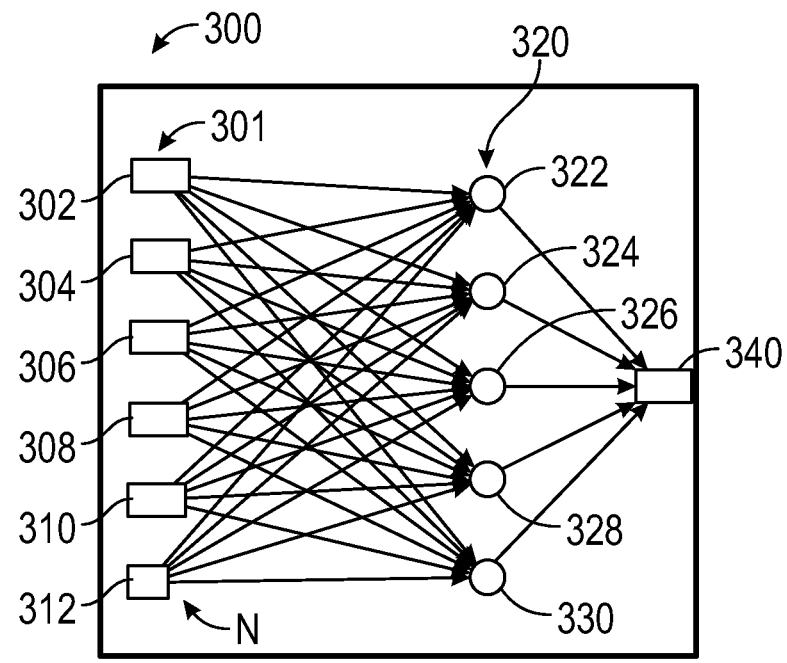
FIG. 5 is a schematic example of a neural network employable by one of the machine learning modules of FIG. 1.

As noted above, the machine learning modules 20 may include a mix of different types of machine learning models. The machine learning modules 20 of FIG. 1 may include at least one neural network, an example of which is shown in FIG. 5. Referring to FIG. 5, the neural network 300 is a feedforward artificial neural network having at least three layers, including an input layer 301, at least one hidden layer 320 and an output layer 340. Each layer is composed of respective nodes N configured to perform an affine transformation of a linear sum of inputs. The respective nodes N are characterized by a respective bias and respective weighted links. The parameters of each respective node N may be independent of others, i.e., characterized by a unique set of weights. The input layer 301 may include first input node 302, second input node 304, third input node 306, fourth input node 308, fifth input node 310 and sixth input node 312. The respective nodes N in the input layer 301 receive the input, normalize them and forward them to respective nodes N in the hidden layer 320.

Referring to FIG. 5, the hidden layer 320 may include first hidden node 322, second hidden node 324, third hidden node 326, fourth hidden node 328 and fifth hidden node 330. Each respective node N in a subsequent layer computes a linear combination of the outputs of the previous layer. A network with three layers would form an activation function $f(x)=f(3)(f(2)(f(1)(x)))$. The activation function $f$ may be linear for the respective nodes N in the output layer 340. The activation function $f$ may be a sigmoid for the hidden layer 320. A linear combination of sigmoids may be used to approximate a continuous function characterizing the output vector y. The patterns recognized by the neural network 300 may be translated or converted into numerical form and embedded in vectors or matrices.

Figure 6:
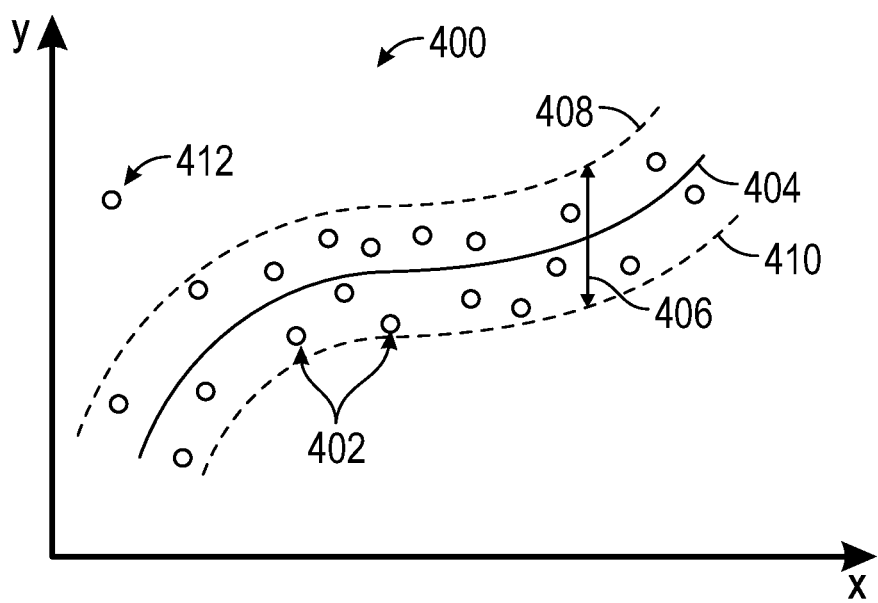
FIG. 6 is a schematic example of a support vector regression (SVR) model employable by one of the machine learning modules of FIG. 1.

The machine learning modules 20 may include at least one support vector regression model 400, an example of which is shown in FIG. 6. The support vector regression model 400 is configured to find a function (hyperplane 404 in FIG. 6) such that the data points 402 are within a margin 406 from this function, i.e., inside a first boundary line 408 and a second boundary line 410. Referring to FIG. 6, the hyperplane 404 may be defined as the line that will match the input vector x to the output vector y, i.e., predict a target value. The hyperplane 404 is individualized so as to maximize the margin 406 and minimize a predefined error. If there are points (such as extraneous point 412) that are outside the margin 406, a penalty may be built into the support vector regression model 400. Prior to ascertaining the hyperplane 404, the support vector regression model 400 may employ a kernel function to map a lower dimensional dataset into a higher dimensional dataset. Other machine learning models available to those skilled in the art may be employed.

The machine learning modules 20 may employ at least one deep learning map to match an input vector x to an output vector y by learning an activation function $f$ such that $f(x)$ maps to y. A training process enables the machine learning modules 20 to correlate the appropriate activation function $f(x)$ for transforming the input vector x to the output vector y. For example, in the case of a simple linear regression model, two parameters are learned: a bias and a slope. The bias is the level of the output vector y when the input vector x is 0 and the slope is the rate of predicted increase or decrease in the output vector y for each unit increase in the input vector x. Once the machine learning modules 20 are respectively trained, estimated values of the output vector y may be computed with new values of the input vector x.

In summary, the system 10 (via execution of the method 200) provides better utilization of available data and requires less matched data for training. The modular architecture of inter-connected machine learning predictors is relatively fast to train and transferable between vehicle models. Additionally, the system 10 provides flexibility since different types of models may be used for the different predictors.

The controller C of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a set of files in a file rechargeable energy storage system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating rechargeable energy storage system and may include files stored in various formats. An RDBMS may employ the Structured Query Language (SQL) in addition to a language for creating, storing, editing, and executing stored procedures, such as the PL/SQL language mentioned above.

The flowchart in FIG. 3 illustrates an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based rechargeable energy storage systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for predicting energy consumption by a vehicle, the system comprising:
   a controller adapted to receive a route plan for the vehicle for a trip, the controller having a processor and tangible, non-transitory memory on which instructions are recorded,
   a plurality of machine learning modules selectively executable by the controller, including a behavior predictor, a driving consumption predictor and an auxiliary consumption predictor, the plurality of machine learning modules including at least two types of machine learning models;
   a feature extractor adapted to extract a first set of features, the trip having a number of trip segments such that the first set of features includes an average traffic speed of each of the trip segments in the trip;
   wherein the behavior predictor is adapted to receive the average traffic speed and generate a predicted average vehicle speed for each of the trip segments, the predicted average vehicle speed being based in part on the average traffic speed, a squared value of the average traffic speed and a set of learned coefficients;
   wherein the predicted average vehicle speed (AVS) is used to calculate at least two hinge functions, including MAX (0, AVS) and MAX (0, AVS−v1), where v1 is a predetermined speed;
   wherein the at least two hinge functions are employed to select an aerodynamic model for the driving consumption predictor, the aerodynamic model being based on at least one of surface friction and/or wind resistance encountered by the vehicle;
   wherein the driving consumption predictor is adapted to predict a primary energy consumed for propelling the vehicle based in part on the route plan and the predicted average vehicle speed;
   wherein the auxiliary consumption predictor is adapted to predict a secondary energy consumed by the vehicle for non-propulsion purposes;
   wherein the controller is adapted to predict a total energy consumed by the vehicle during the trip by executing the plurality of machine learning modules;
   wherein the controller is adapted to control the vehicle based in part on the predicted total energy consumption, including using the predicted total energy consumption for performance monitoring of the vehicle.

2. The system of claim 1, wherein the plurality of machine learning modules includes at least two types of machine learning models.

3. The system of claim 1, wherein the auxiliary consumption predictor includes an HVAC sub-module adapted to predict the secondary energy consumed by the vehicle for heating, cooling and ventilation purposes.

4. The system of claim 1, wherein the auxiliary consumption predictor includes a battery thermal conditioning sub-module adapted to predict the secondary energy consumed for thermal conditioning.

5. The system of claim 1, further comprising:
a communications interface adapted to receive the route plan, including a starting point, a destination and a selected route for the trip.

6. The system of claim 1, wherein the first set of features includes traffic data, time data and weather data, with the traffic data including live speed, speed limits and historical speed, the time data including a time of day and a day of week, and the weather data including ambient temperature, wind speed and wind direction.

7. The system of claim 1, wherein the feature extractor is adapted to:
extract weather data, including an ambient temperature; and
calculate a first temperature deviation of the ambient temperature above a predefined neutral temperature, and calculate a second temperature deviation of the ambient temperature below the predefined neutral temperature.

8. The system of claim 1, wherein the predicted average vehicle speed (AVS) is obtained as: [AVS=a+b*ATS+c*ATS$^2$], where the average traffic speed is ATS, the squared value of the average traffic speed is ATS$^2$ and the set of learned coefficients is (a, b, c).

9. The system of claim 1, wherein the feature extractor is adapted to extract a second set of features, the driving consumption predictor being adapted to receive the second set of features and the predicted average vehicle speed generated by the behavior predictor.

10. The system of claim 9, wherein the auxiliary consumption predictor is adapted to receive the second set of features and wherein the total energy consumed by the vehicle during the trip is obtained by adding the primary energy and the secondary energy.

11. The system of claim 9, wherein the second set of features includes route data and weather data, the route data including respective values of latitude, longitude, elevation, length and road quality of the trip segments and the weather data including ambient temperature, wind speed and wind direction.

12. A method of operating a system for predicting energy consumption by a vehicle during a trip, the vehicle having a controller with a processor and tangible, non-transitory memory, the method comprising:
receiving a route plan for the trip, via the controller, the controller having access to a plurality of machine learning modules, including a behavior predictor, a driving consumption predictor and an auxiliary consumption predictor, the plurality of machine learning modules including at least two types of machine learning models;
extracting a first set of features, via a feature extractor in communication with the controller, the first set of features including an average traffic speed of at least one trip segment in the trip;
transmitting the average traffic speed to the behavior predictor, via the controller;
generating a predicted average vehicle speed for the at least one trip segment via the behavior predictor, the predicted average vehicle speed being based in part on the average traffic speed, a squared value of the average traffic speed and a set of learned coefficients;
predicting a primary energy consumed for propelling the vehicle based in part on the route plan and the predicted average vehicle speed, via the driving consumption predictor, the predicted average vehicle speed (AVS) being used to calculate at least two hinge functions, including MAX (0, AVS) and MAX (0, AVS−v1), where v1 is a predetermined speed;
selecting an aerodynamic model for the driving consumption predictor based on the at least two hinge functions, the aerodynamic model being based on at least one of surface friction and/or wind resistance encountered by the vehicle;
predicting a secondary energy consumed for non-propulsion purposes in the vehicle, via the auxiliary consumption predictor; and
predicting a total energy consumed by the vehicle during the trip by executing the plurality of machine learning modules, via the controller; and
controlling the vehicle based in part on the predicted total energy consumption, including using the predicted total energy consumption for performance monitoring of the vehicle.

13. The method of claim 12, further comprising:
incorporating at least two types of machine learning models in the plurality of machine learning modules.

14. The method of claim 12, further comprising:
predicting the secondary energy consumed by an HVAC unit of the vehicle, via an HVAC sub-module in the auxiliary consumption predictor.

15. The method of claim 12, further comprising:
extracting a second set of features, via the feature extractor; and
transmitting the second set of features and the predicted average vehicle speed to the driving consumption predictor, via the controller.

16. A system for predicting energy consumption by a vehicle, the system comprising:
a controller adapted to receive a route plan for the vehicle for a trip, the controller having a processor and tangible, non-transitory memory on which instructions are recorded;
a plurality of machine learning modules selectively executable by the controller, including a behavior predictor, a driving consumption predictor and an auxiliary consumption predictor, the plurality of machine learning modules including at least two types of machine learning models;
wherein the trip is divided into a number of trip segments and the behavior predictor is adapted to predict an average vehicle speed for each of the trip segments based at least partially on traffic conditions;
wherein the behavior predictor is adapted to receive the average traffic speed and generate a predicted average vehicle speed for each of the trip segments, the predicted average vehicle speed being based in part on the average traffic speed, a squared value of the average traffic speed and a set of learned coefficients;
wherein the driving consumption predictor is adapted to predict a primary energy consumed for propelling the vehicle based in part on the route plan and the predicted average vehicle speed, the predicted average vehicle speed (AVS) being used to calculate at least two hinge functions, including MAX (0, AVS) and MAX (0, AVS−v1), where v1 is a predetermined speed;

wherein the at least two hinge functions are employed to select an aerodynamic model for the driving consumption predictor, the aerodynamic model being based on at least one of surface friction and/or wind resistance encountered by the vehicle;

wherein the auxiliary consumption predictor is adapted to predict a secondary energy consumed by the vehicle for non-propulsion purposes, the auxiliary consumption predictor including an HVAC sub-module;

wherein the controller is adapted to predict a total energy consumed by the vehicle during the trip by executing the plurality of machine learning modules; and wherein the controller is adapted to control the vehicle based in part on the predicted total energy consumption, including using the predicted total energy consumption for performance monitoring of the vehicle.

* * * * *